UNITED STATES PATENT OFFICE.

CARL NEUMANN, OF LAWRENCE, KANSAS.

IMPROVEMENT IN BEVERAGES OR SUMMER-DRINKS.

Specification forming part of Letters Patent No. 157,924, dated December 22, 1874; application filed June 15, 1874.

*To all whom it may concern:*

Be it known that I, CARL NEUMANN, of Lawrence, Douglas county, Kansas, have invented a Summer-Beverage, of which the following is a specification:

This invention has relation to summer-beverages; and consists of the proper combination of sulphuric acid, alcohol, carbonate of magnesia, oil of orange-flowers, distilled water, oil of roses, Concord wine, kermesine sirup, bicarbonate of potash, white sugar, alum, and well-water, or spring-water, in such a manner as to produce a pleasant beverage as well as system tonic, substantially as hereinafter more fully described or specified.

The ingredients are divided into five parts, and composed as follows:

No. 1 is composed of chemically-pure sulphuric acid, concentrated, (English,) and absolute alcohol, chemically-pure, eight troy ounces each. Put the alcohol in an open-mouthed glass bottle, completely surrounded with ice, and add the sulphuric acid, slowly, drop by drop, to the alcohol, keeping the bottle cool during the operation by the addition of sufficient ice. Keep this mixture in a well (tight) stopped glass bottle.

No. 2, *a* and *b*, are the flavorings, composed as follows: *a* is the orange-flower water, and *b* is the rose-flower water. The orange-flower water is composed of carbonate of magnesia, one dram; oil of orange-flowers, (best,) forty drops; distilled water, four pints. Rub the oil with the carbonate of magnesia, adding the water gradually, and filter through paper. Flavoring *b* is composed of carbonate of magnesia, one dram; oil of roses, (best,) forty drops; distilled water, four pints. Rub the magnesia and oil together, adding the distilled water slowly, and filter through paper.

No. 3 is native Concord wine.

No. 4 is composed of finely-powdered cochineal, half a troy ounce; bicarbonate of potash, powdered, forty grains; distilled water, one gallon. Place the cochineal and bicarbonate of potash and the water in a glass vessel, and allow the mixture to macerate for an hour and a half; then strain through a woolen cloth. To the strained liquor add of best white granulated sugar twelve pounds avoirdupois. Boil the sugar and strained liquor together till the sugar is dissolved and a sirup formed, letting it boil a few minutes after the sirup forms. Before removing the receptacle from the fire add twenty-four grains of alum, (sulphide of aluminum and ammonium.—*U. S. P.,*) and strain the sirup through a woolen strainer. Allow this sirup to cool, and add flavorings No. 2, (*a* and *b,*) eight ounces of each. The above mixture (No. 4) is termed kermesine sirup.

Ingredient No. 5 is well or spring water.

To combine the ingredients for the beverage, take of ingredient No. 1, one and a half fluid ounces; ingredient No. 3, four fluid ounces; kermesine sirup, (ingredient No. 4,) eight fluid ounces. Mix and keep in a glass-stopped bottle. This mixture is a medicine; dose, a teaspoonful, in a little water. To complete the combination for the beverage add to four fluid ounces of this mixture twelve fluid ounces of kermesine sirup, (ingredient No. 4.) One ounce of this in a large tumbler of cold well or spring water is a pleasant tonic beverage.

What I claim as my invention, and desire to secure by Letters Patent, is—

The beverage composed of the ingredients Nos. 1, 2, (*a* and *b,*) 3, 4, and 5, in combination with each other, as and for the purpose described.

In testimony of which invention I hereunto set my hand.

DOCTOR CARL NEUMANN.

Witnesses:
JOHN THOMAS MOORE,
JOSIAH A. HARD.